(12) United States Patent
Schneider et al.

(10) Patent No.: US 7,047,766 B2
(45) Date of Patent: May 23, 2006

(54) INVERTER MECHANISM FOR A GLASS FORMING MACHINE

(75) Inventors: Wilhelm Schneider, Auetal (DE); Dirk Winkelhake, Nienstädt (DE); Hermann Bögert, Auetal (DE)

(73) Assignee: Heye International GmbH, Obernkirchen (DE)

( * ) Notice: Subject to any disclaimer, the term of this patent is extended or adjusted under 35 U.S.C. 154(b) by 361 days.

(21) Appl. No.: 10/275,015

(22) PCT Filed: Jul. 4, 2001

(86) PCT No.: PCT/EP01/07630

§ 371 (c)(1),
(2), (4) Date: Oct. 30, 2002

(87) PCT Pub. No.: WO02/18283

PCT Pub. Date: Mar. 7, 2002

(65) Prior Publication Data

US 2003/0101758 A1    Jun. 5, 2003

(30) Foreign Application Priority Data

Aug. 26, 2000 (DE) .......................... 200 14 811 U

(51) Int. Cl.
*C03B 11/16* (2006.01)

(52) U.S. Cl. ............................ 65/236; 65/260; 65/261; 65/360; 65/361

(58) Field of Classification Search .................. 65/232, 65/235, 236, 357, 359, 360, 361, 260, 261
See application file for complete search history.

(56) References Cited

U.S. PATENT DOCUMENTS

| 3,445,218 A | | 5/1969 | Trudeau ...................... 65/235 |
| 3,573,027 A | | 3/1971 | Nuzum, Sr. ................... 65/235 |
| 3,617,233 A | | 11/1971 | Mumford ...................... 65/307 |
| 3,638,352 A | * | 2/1972 | Christiansen ................ 446/120 |
| 4,842,636 A | | 6/1989 | Libert .......................... 65/232 |
| 5,843,201 A | * | 12/1998 | Borbone et al. ............... 65/158 |

FOREIGN PATENT DOCUMENTS

| DE | 35 27 758 C2 | 2/1989 |
| DE | 195 17 281 C1 | 8/1996 |
| IT | 01247203 | 6/1991 |

OTHER PUBLICATIONS

Shigley et al., Standard Handbook of Machine Design, copyright 1996, McGraw-Hill, 2nd Edition, pp. 32.1-32.4 and 46.1-46.3*
Oberg et al., Machinery's Handbook, copyright 2000, Industrial Press, 26th Edition, pp. 2084.*

(Continued)

*Primary Examiner*—Sean Vincent
(74) *Attorney, Agent, or Firm*—Synnestvedt & Lechner LLP

(57) ABSTRACT

An invert mechanism for moving parisons between a pre-forming station and a finishing forming station of a glass forming machine is disclosed. The mechanism is disposed above a cover plate of a frame of the glass forming machine. An electric motor is disposed with its horizontal longitudinal axis above the cover plate. A driven shaft of the electric motor is connected to a horizontal invert shaft by means of a transmission. Between the driven shaft of the electric motor and the transmission a planetary gear is connected.

20 Claims, 6 Drawing Sheets

OTHER PUBLICATIONS

Xferplus entry #2157208, Academic Press Dictionary of Science and Technology, copyright 1992. http://www.xferplus.com/entry/3157208.*

Smith, Mechanical Engineer's Reference Book, copyright 1998, Elsevier, pp. 10/15, 10/17, 10/24.*

* cited by examiner

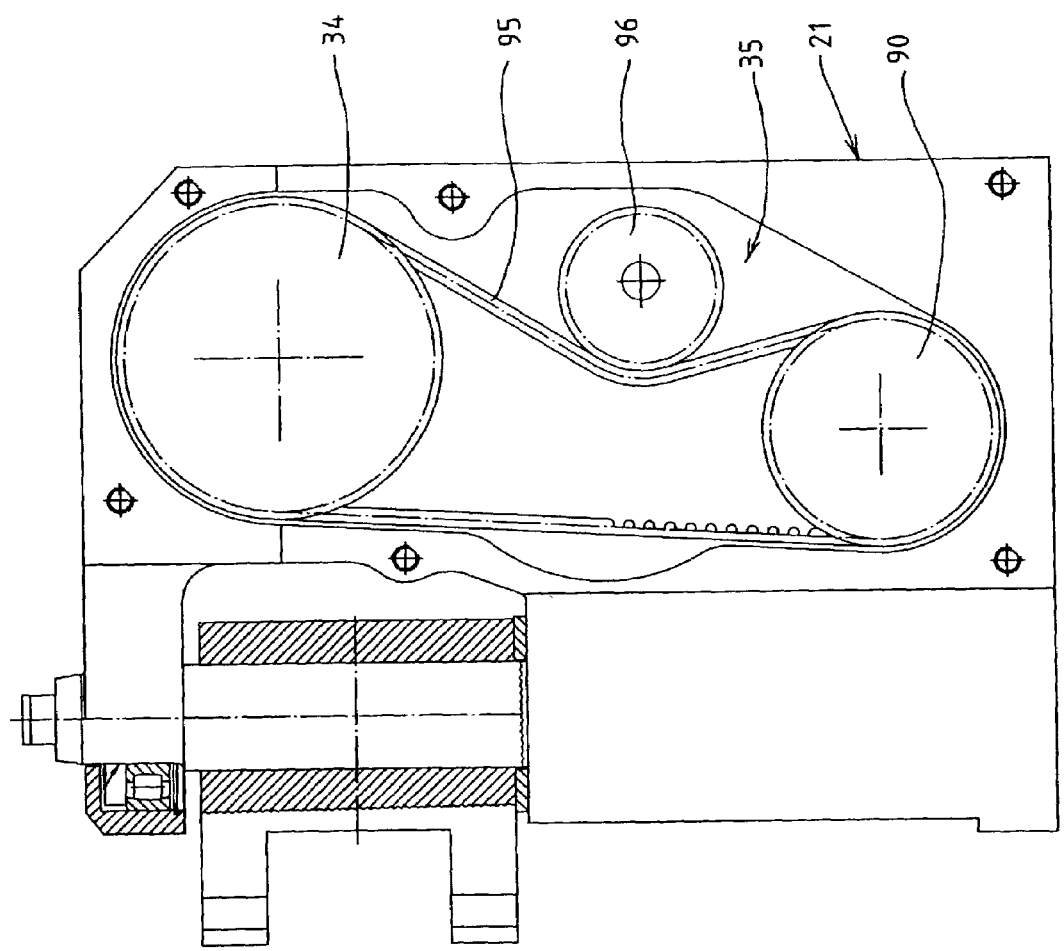

US 7,047,766 B2

INVERTER MECHANISM FOR A GLASS FORMING MACHINE

FIELD OF THE INVENTION

The invention relates to an invert mechanism for a glass forming machine for pre-forming and finishing parisons. The glass forming machine includes a frame box having a cover plate, a parision pre-forming station and a parison finishing forming station. The invert mechanism includes an invert shaft rotatably mounted on the glass forming machine above the cover plate. A neck mold holder is mounted on the invert shaft and is rotatable with the invert shaft in a reciprocating manner between the pre-forming and finishing forming stations. The invert shaft is rotated by an electric motor having a drive shaft with a longitudinal axis positioned above the cover plate. A transmission connects the drive shaft to the invert shaft.

BACKGROUND OF THE INVENTION

In a known invert mechanism of this type, as shown in Italian patent publication IT 1 247 203 B, FIG. 2, the electric servomotor is mounted with its vertical longitudinal axis below the cover plate of the box in a housing. The electric servomotor drives a coaxial shaft which has a screw at the top. The screw is engaged with a worm wheel attached to the invert shaft. This construction method is costly, involves large rotating masses and takes up valuable space in the box.

It is known per se from German Patent Publication. DE 195 17 281 C1 to mount the two guide sleeves directly on the invert shaft. The axial opening and closing movements of the guide sleeves are not synchronized with each other.

It is known per se from U.S. Pat. No. 3,445,218 to attach a toothed rack to each half of the neck mold holder. The toothed racks extend, in parallel with and spaced apart from each other, in parallel with the opening and closing direction of the neck mold holder halves. The space is bridged by a pinion which can be rotationally driven in a reciprocating manner and which is engaged with both toothed racks. In this way, at a high construction cost and with large space requirements, synchronization of the opening and closing movements of the neck mold holder halves is achieved.

It is known per se from German Patent Publication DE 35 27 758 C2 to drive the invert shaft in a reciprocating manner by a motor, wherein a direct current motor is preferably used, which is connected directly to the invert shaft and carries out less than one rotation for each movement of the invert arm between its two end positions (column 2, lines 57 to 63). A control circuit for the rotational movement of the invert shaft is disclosed.

SUMMARY OF THE INVENTION

It is the object of the invention to improve the rotational drive of the invert shaft. This object is achieved by using an invert mechanism that includes an invert shaft rotatably mounted on the glass forming machine above the cover plate. A neck mold holder is mounted on the invert shaft and is rotatable with the invert shaft in a reciprocating manner between the pre-forming and finishing forming stations. The invert shaft is rotated by an electric motor having a drive shaft with a longitudinal axis also positioned above the cover plate. A transmission connects the drive shaft to the invert shaft. The glass forming machine can be, for example a section of a so-called I.S. (individual section) glass forming machine. The halves of the neck mold holder with at least a neck mold and a parison held thereby are preferably rotated by 180° out of the preforming station and into the finishing forming station in one operating cycle. At that location the neck mold holder halves and therefore the neck tool halves of the neck mold are opened and the parison is delivered to a finishing mold in the finishing forming station. The neck mold holder halves are then closed with the neck molds and rotated by 180° back into the preforming station. By reason of the "horizontal" arrangement of the electric servomotor above the cover plate the space available at that location is optimally used. Furthermore, no space is required inside the box for the invert mechanism and its drive. The space inside the box is therefore wholly available for other purposes. Furthermore, the invert mechanism can in this way be more easily assembled and disassembled and is more easily accessible for inspection and maintenance work. The transmission transmits the output of the electric servomotor to the invert shaft transversely to its longitudinal axis.

Preferably, the drive shaft of the electric motor is connected to the transmission using a planetary gear disposed coaxial to the electric motor.

A very stable and reliable transmission is produced using a transmission having a first toothed wheel coaxial to the electric motor, a second toothed wheel attached to the invert shaft, and an intermediate toothed wheel that meshes with the first and second toothed wheels. The electric motor drives the first toothed wheel in a reciprocating manner.

When relatively little power is to be transmitted a toothed belt drive is used. The toothed belt drive has a first toothed wheel coaxial to the electric motor and a second toothed wheel attached to the invert shaft. A toothed belt meshes with the first and second toothed wheels, the first toothed wheel being driven in a reciprocating manner by the electric motor.

It is possible to transmit greater power using a toothed chain drive. The toothed chain drive has a first toothed chain wheel coaxial to the electric motor and a second toothed chain wheel attached to the invert shaft. A chain meshes with the first and second toothed chain wheels.

The electric motor drives the first toothed wheel in a reciprocating manner. In this case, for example, it is possible for toothed chain drives in accordance with DIN 8190 and 8191 to be used.

It is possible to create constructional freedom in the regions of the invert shaft by having the transmission engage an end of the invert shaft.

Preferably, the neck mold holder halves are mounted on guide sleeves which are concentric to the invert shaft and can be rotationally driven by the invert shaft in a reciprocating manner. Both guide sleeves are axially displaceable relative to the invert shaft. It is relatively simple to ensure reliable forced synchronization of the opening and closing movements of the guide sleeves and therefore of the neck mold holder halves mounted thereon by mounting a pin on each guide sleeve. The pins extend radially inwardly and each carries a cam roller. Each cam roller engages a cam groove of a cam sleeve that is mounted so as to be freely rotatable but be axially fixed on the invert shaft.

Each guide sleeve is engaged by means of a spline hub profile in a spline shaft profile of a drive sleeve which is connected in a rotationally fixed manner to the invert shaft. The drive sleeve extends into both guide sleeves. In the region of movement of the two pins, the drive sleeve has an axially parallel slot allowing passage of the pins.

The drive sleeve can be fixed on the invert shaft next to the end faces of the cam sleeve by a respective annular spring clamping unit. At the opposite the end faces of the drive sleeve are disposed respective annular pistons which can be displaced in a sealed manner on the invert shaft. A duct is formed in the invert shaft so that a pressure medium can be simultaneously supplied to piston surfaces which face the drive sleeve.

Compressed air is particularly used as a pressure medium for opening the neck mold holder halves. Each annular piston is supported on a return spring which is supported on the other side against the invert shaft.

These and further features and advantages of the invention are explained in more detail hereinunder with the aid of the exemplified embodiments illustrated in the drawings.

BRIEF DESCRIPTION OF THE DRAWINGS

FIG. 6 shows a view corresponding to FIG. 5 of a modified transmission.

DETAILED DESCRIPTION OF EMBODIMENTS

Figure 1:
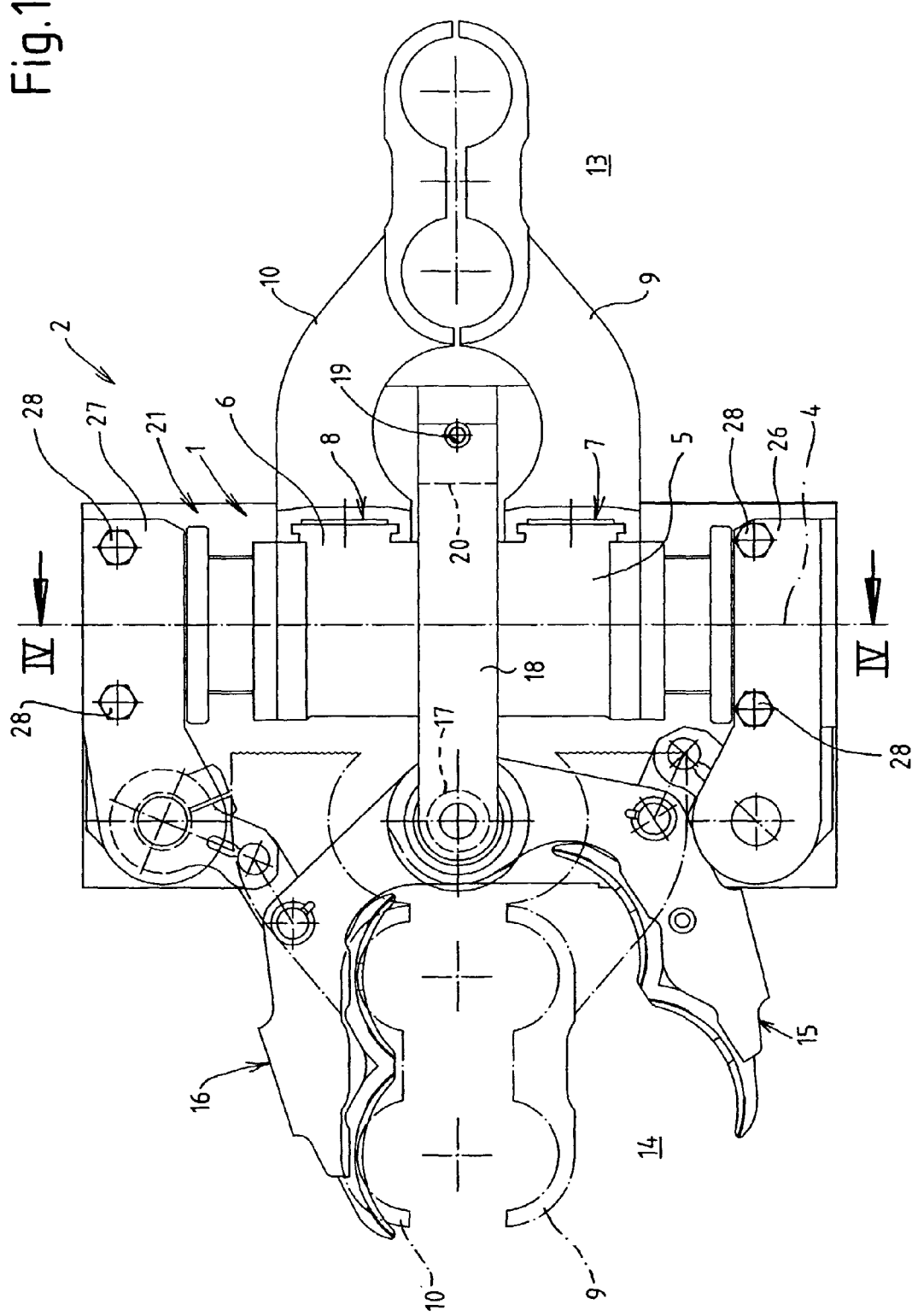
FIG. 1 shows the plan view of an invert mechanism and parts of a finishing forming station.

FIG. 1 shows an invert mechanism 1 for a glass forming machine 2, which can be, in particular, a section of an I.S. glass forming machine.

The invert mechanism 1 has an invert shaft 3 (FIG. 2) with a horizontal longitudinal axis 4. Guide sleeves 5 and 6 are connected to the invert shaft 3—in a way which will be described hereinunder—in a rotationally fixed manner but so as to be displaceable in the direction of the longitudinal axis 4. By means of a guide connection 7 and 8 each guide sleeve 5, 6 has a neck mold holder half 9 and 110 connected to it. In this example, the neck mold holder halves 9, 10 hold two neck molds 11 in a manner which is known per se, one of which neck molds is shown in FIG. 3.

In a manner which is known per se the neck molds 11 are rotated with parisons 12 held thereby (FIG. 3) by 180° about the longitudinal axis 4 out of a preforming station 13 of the glass forming machine 2 into a finishing forming station 14 of the glass forming machine 2. In the finishing forming station 14 finishing mold tong halves 15 and 16 are mounted in a manner which is known per se so as to be able to pivot about a vertical hinge column 17. In order to stabilize the hinge column 17 its upper end (see also FIG. 3) has a horizontal yoke 18 attached to it, the other end of which yoke is attached by a screw 19 to a vertical column 20 of a housing 21 of the invert mechanism 1.

In FIG. 1 the neck mold holder halves 9, 10 are shown in their closed position on the right-hand side. On the left-hand side of FIG. 1 the neck mold holder halves 9, 10 are shown in a broken line in their opened position, in which the associated neck molds (11 in FIG. 3) are also opened and the parisons (12 in FIG. 3) are delivered into the finishing molds.

Figure 2:
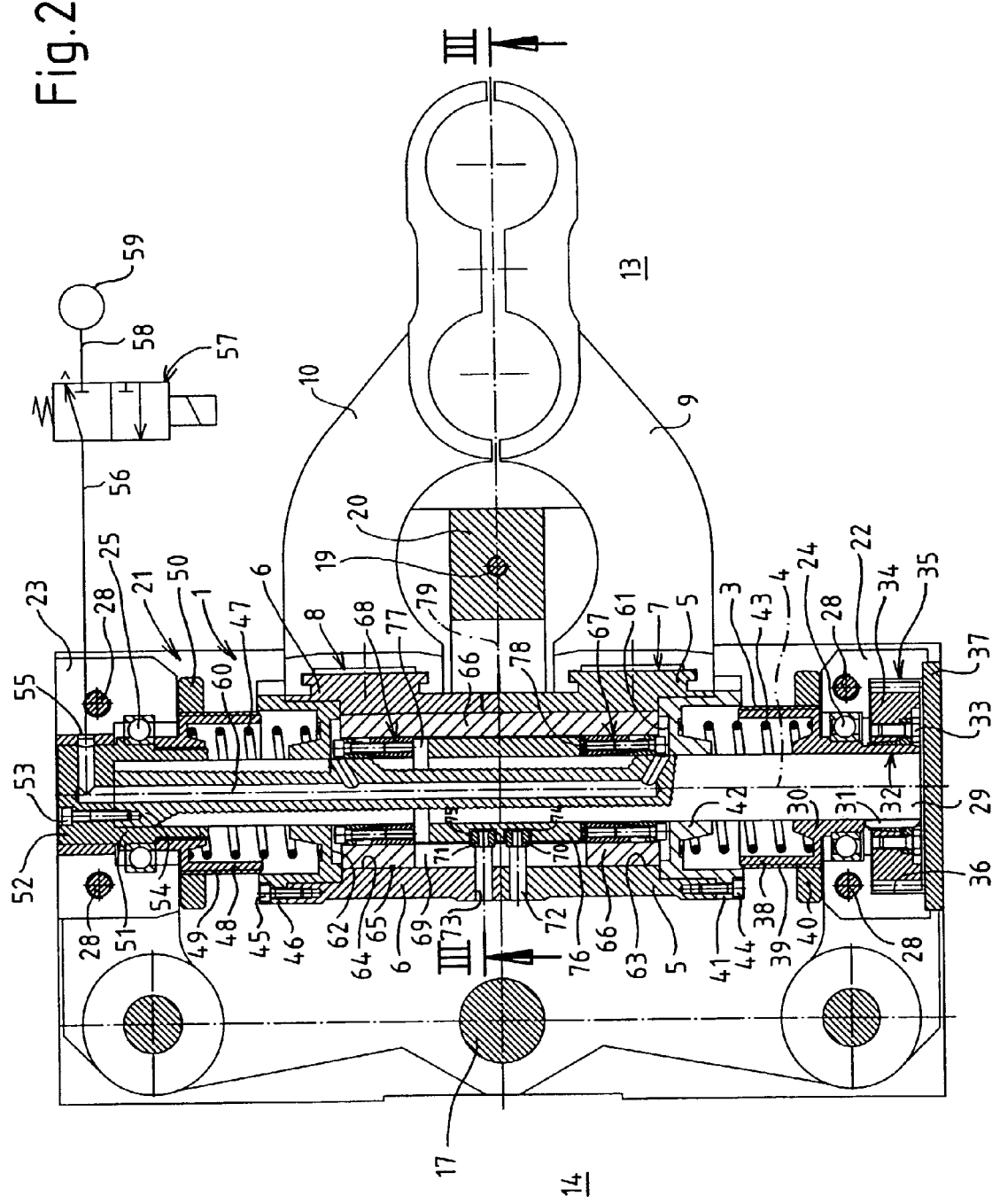
FIG. 2 shows the cross-sectional view along line II—II of FIG. 3 through the invert mechanism according to FIG. 1.
Figure 3:
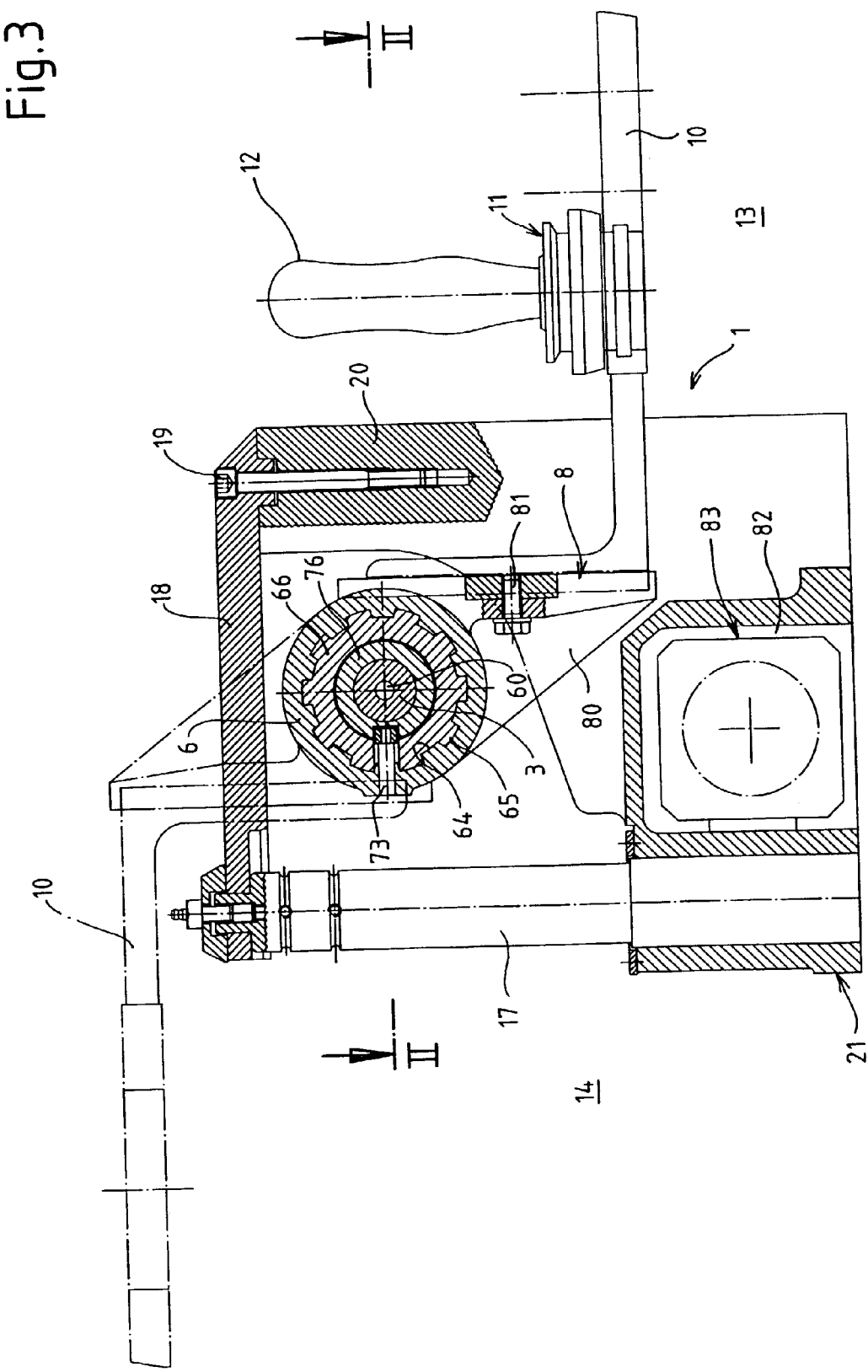
FIG. 3 shows the cross-sectional view along line III—III of FIG. 2.

FIG. 2 shows the lower bearing support shells 22 and 23 of the housing 21, which receive a respective roller bearing 24 and 25. The roller bearings 24, 25 and the lower bearing support shells 22, 23 then have a respective upper bearing support shell 26 and 27 (FIG. 1) positioned on them and fixed by two screws 28.

In accordance with FIG. 2 a sleeve 30 is pushed onto an axial end 29 (the lower end in FIG. 2) of the invert shaft 3 and on its—in FIG. 2—lower end has at least one (preferably two diametrically opposite) slot(s) 31. This slotted sleeve 30 is part of an annular spring clamping unit 32 by which, using screws 33, on the one hand the sleeve 30 is pressed in a rotationally fixed manner onto the end 29 and on the other hand a second toothed wheel 34 of a transmission 35 is fixed on the sleeve 30. An orifice 36 receiving the transmission 35 in the housing 21 can be closed by a housing cover 37.

The sleeve 30 lies against an internal ring of the roller bearing 24 and is extended upwards into a cup 38 in FIG. 2. The cup 38 has an external thread 39 along which an adjusting nut 40 can be set. The adjusting nut 40 forms an axial stop for an annular piston 41 which can be axially displaced—being sealed by an internal flange 42—on the invert shaft 3. One end of a retune spring 43 formed as a compression spring is inserted into the cup 38, the other end thereof is supported on the annular piston 41. The annular piston 41 is connected to the guide sleeve 5 by screws 44. The guide sleeve 6 is connected to a similar annular piston 46 by screws 45. On the—in FIG. 2—upper side of the annular piston 46, a return spring 47 formed as a compression spring is supported, which extends into a cup 48 on the other side. The cup 48 is also provided with an external thread 49 and an adjusting nut 50 which can be set thereon. At its upper end the cup 48 is screwed to a sleeve 51 which lies against an internal ring of the roller bearing 25. The sleeve 51 has an—in FIG. 2—upper base 52 which is attached by screws 53 to an—in FIG. 2—upper axial end 54 of the invert shaft 3.

The base 52 has a connection orifice 55 which is connected by a line 56 to a 3-way/2-position valve 57. The directional control valve 57 is connected to a source of compressed air 59 by means of a line 58. From the connection orifice 55 a duct 60 extends through the base 52 and the—in FIG. 2—upper part of the invert shaft 3 to mutually opposite piston surfaces 61 and 62 of the annular pistons 41, 46.

The guide sleeves 5, 6 are respectively engaged with a spline shaft profile of a drive sleeve 66 by means of a spline hub profile 63 and 64 (see also FIG. 3). The drive sleeve 66 extends into both guide sleeves 5, 6 and at its axial ends is fixed to the invert shaft 3 by a respective annular spring clamping unit 67 and 68. The drive sleeve 66 has an axially parallel slot 69 between the annular spring clamping units 67, 68. Each guide sleeve 5, 6 has a pin 72 and 73 which extends radially inwards and there carries a cam roller 70 and 71. The pins 72, 73 pass through the slot 69 while the cam rollers 70, 71 engage in a respective cam groove 74 and 75 of a cam sleeve 76. The cam sleeve 76 is mounted in a freely rotatable manner on the invert shaft 3 but is fixed in the axial direction on the one hand by a collar 77 of the invert shaft 3 and on the other hand by an annular disc 78 next to the annular spring clamping unit 76. The cam grooves 74, 75 are formed with mirror symmetry with respect to a transverse middle plane 79 of the cam sleeve 76 in an outer surface of the cam sleeve 76, and in a three-dimensional manner in the peripheral direction and in the axial direction of the cam sleeve 76. The cam sleeve 76 has slight radial play with respect to an inner surface of the drive sleeve 66.

When, starting from the condition shown in FIG. 2, the directional control valve 57 is switched to its other switching position, compressed air passes through the line 56 and the duct 60 to the piston surfaces 61, 62 and pushes the annular pistons 41, 46 apart against the force of the return springs 43, 47. In this way the guide sleeves 5, 6 are also moved axially away from each other, wherein the cam rollers 70, 71 roll in the cam grooves 74, 75 of the cam sleeve 76 and thus rotate the cam sleeve 76 about the longitudinal axis 4. The formation of the cam grooves 74, 75 with mirror symmetry means that the guide sleeves 5, 6 and therefore the neck mold holder halves 9, 10 open in a strictly synchronous manner. This opening movement continues until the annular piston 41 comes into position on the adjusting nut 40 and the annular piston 46 comes into position on the adjusting nut 50.

If the neck mold holder halves 9, 10 are to be closed, the directional control valve 57 is switched back into its switching position shown in FIG. 2. In this way the cylinder spaces of the annular pistons 41, 46 and the duct 60 and the line 56 are vented, and the annular pistons 41, 46 together with the components connected thereto return to the starting position shown in FIG. 2 under the effect of the return springs 43, 47.

In accordance with FIG. 3 each of the guide sleeves 5, 6 is provided with an extension 80 on which, along the guide connection 7, 8, the associated neck mold holder halves 9, 10 can be set and can be fixed by a screw 81.

At the bottom of the housing 21 a duct 82 is formed which receives a drive 83. By means of the drive 83, as will be shown in more detail hereinunder, the second toothed wheel 34 (FIG. 2) can be rotationally driven in a reciprocating manner. In a corresponding manner in FIG. 3 the neck mold holder half 10 with its neck molds 11 and parisons 12 is rotated by 180° out of the starting position, illustrated with solid lines, into the transfer position, illustrated in broken lines, in the finishing forming station 14.

Figure 4:
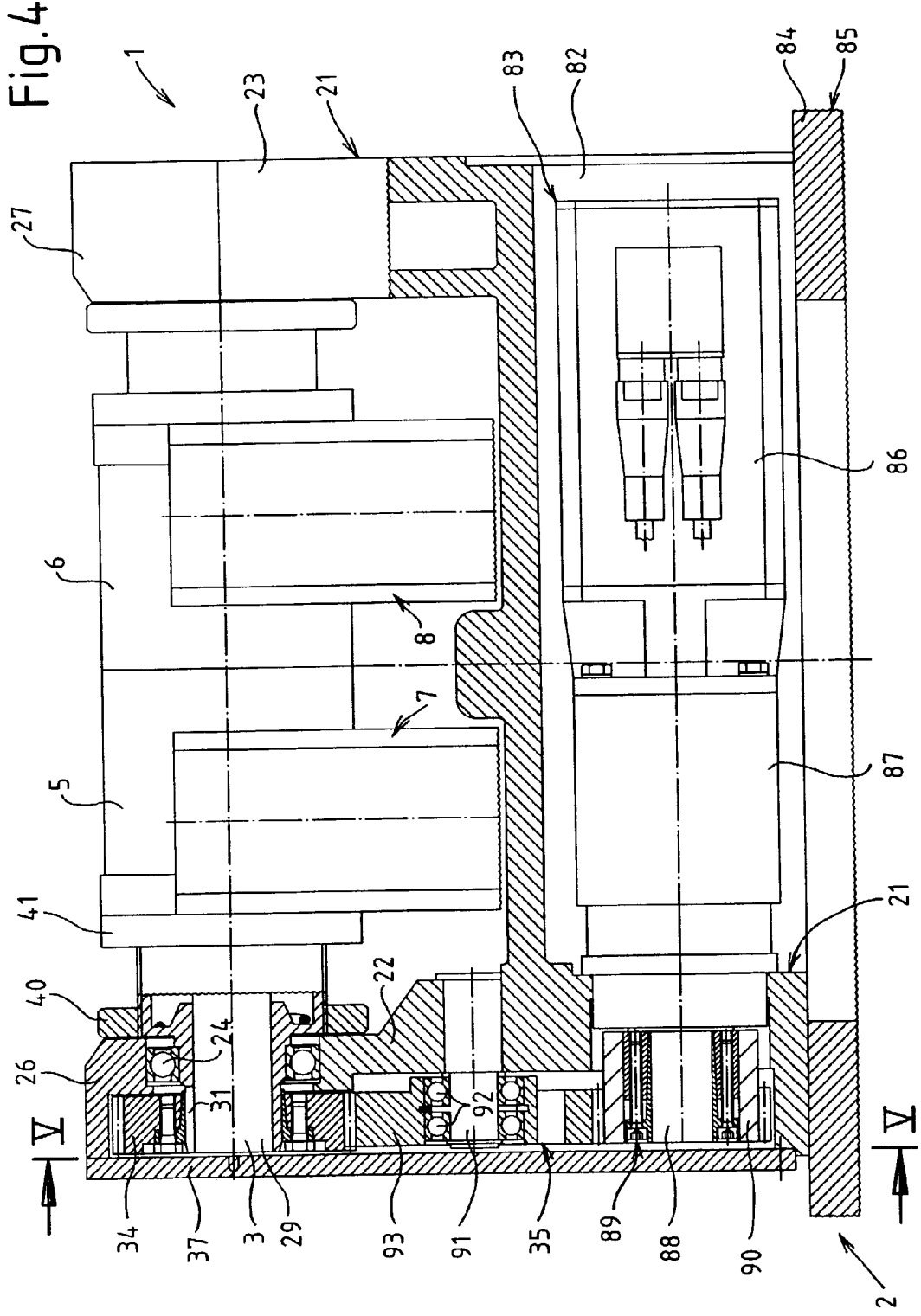
FIG. 4 shows the cross-sectional view along line IV—IV of FIG. 1.

In accordance with FIG. 4 the invert mechanism 1 is placed onto a cover plate 84 of a frame (box) 85 of the glass forming machine 2 and attached thereto.

The drive 83 housed in the duct 82 of the housing 21 has an electric servomotor 86 and a planetary gear 87 coaxially flange-mounted thereon. By means of an annular spring clamping unit 89 a first toothed wheel 90 is fixedly connected to a driven shaft 88 of the planetary gear 87. An axle 91 is fixed in the housing 21, on which axle by means of roller bearings 92 an intermediate toothed wheel 93 is mounted in a freely rotatable manner. The intermediate toothed wheel 93 meshes on the one hand with the first toothed wheel 90 and on the other hand with the second toothed wheel 34. These toothed wheels together form the transmission 35 between the driven shaft 88 and the invert shaft 3.

Figure 5:
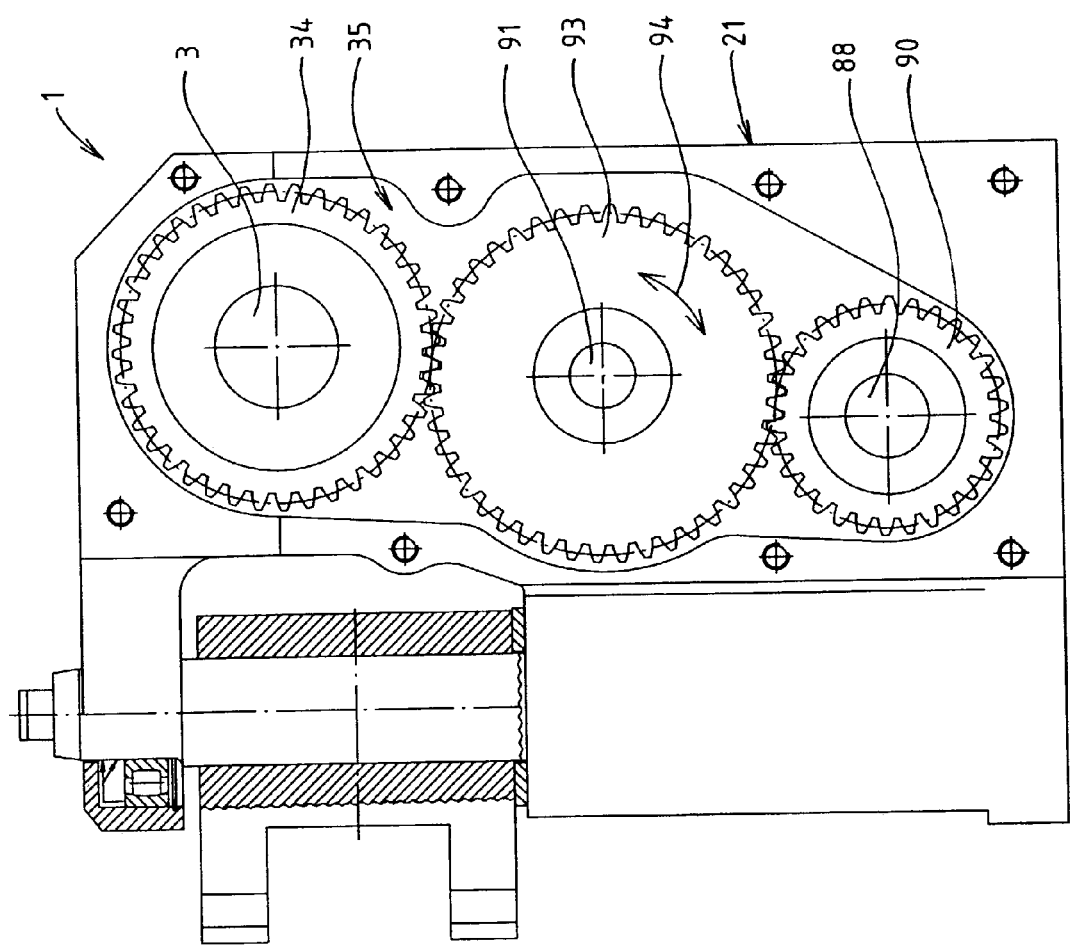
FIG. 5 shows the view along line V—V of FIG. 4

FIG. 5 shows further details of the transmission 35. On the intermediate toothed wheel 93 a double arrow 94 indicates that all toothed wheels of the transmission 35 are rotationally driven in a reciprocating manner.

In the exemplified embodiment according to FIG. 6 parts equivalent to the previously described exemplified embodiment are provided with like reference numerals.

A toothed belt 95 is placed around the first toothed wheel 90 and the second toothed wheel 34 in FIG. 6 and can be tensioned by an eccentrically adjustable tensioning wheel 96.

Instead of the toothed belt 95 it is also possible, when greater power levels are to be transmitted, to use a toothed chain of a toothed chain drive, for example those in accordance with German engineering standard DIN 8090 and 8091.

The invention claimed is:

1. An invert mechanism for a glass forming machine for pre-forming and finishing forming parisons held in a neck mold, said glass forming machine including a frame box having a cover plate mounted thereon, and a parison pre-forming station and a parison finishing forming station, said invert mechanism comprising:
   an invert shaft rotatably mounted on said glass forming machine above said cover plate and positioned between said pre-forming and finishing forming stations;
   a neck mold holder mounted on said invert shaft and movable between said pre-forming and finishing forming stations upon rotation of said invert shaft, said neck mold holder comprising holder halves movable along said invert shaft toward and away from one another for engaging and releasing said neck mold;
   an electric motor mounted on said glass forming machine and having a drive shaft with a longitudinal axis positioned above said cover plate;
   a transmission positioned between said electric motor and said invert shaft for transmitting torque from said drive shaft to said invert shaft for rotating said invert shaft between said pre-forming and finishing forming stations;
   a cam sleeve mounted coaxially on said invert shaft, said cam sleeve being rotatable relative to said invert shaft and fixed axially thereon;
   a pair of cam grooves extending axially and circumferentially in and along said cam sleeve, said cam grooves being symmetric to one another about a mid-plane intersecting said cam sleeve; and
   a pair of guide sleeves mounted coaxially on said cam sleeve adjacent to one another, said guide sleeves being rotationally fixed relatively to said invert shaft and axially movable there along, each said guide sleeve having a pin extending inwardly therefrom toward said cam sleeve, each said pin having a cam roller mounted thereon and engaging one of said cam grooves in said cam sleeve, each of said neck mold halves being mounted on a respective one of said guide sleeves for rotational motion between said pre-forming and finishing forming stations and for axial motion toward and away from one another for engaging and releasing said neck mold.

2. An invert mechanism according to claim 1, further comprising a planetary gear coupling said drive shaft to said transmission.

3. An invert mechanism according to claim 1, wherein said transmission comprises:
   a first toothed wheel mounted coaxially with said drive shaft and rotatable by said electric motor in a reciprocating manner;
   an intermediate toothed wheel rotatably mounted to mesh with said first toothed wheel; and
   a second toothed wheel mounted on said invert shaft and meshing with said intermediate toothed wheel permitting rotation of said invert shaft by said electrical motor.

4. An invert mechanism according to claim 1, wherein said transmission comprises:
   a first toothed wheel mounted coaxially with said drive shaft and rotatable by said electric motor in a reciprocating manner;
   a second toothed wheel mounted on said invert shaft; and
   an endless toothed belt extending between and engaging said first and second toothed wheels permitting rotation of said invert shaft by said electric motor.

5. An invert mechanism according to claim 1, wherein said transmission comprises:
   a first toothed chain wheel mounted coaxially with said drive shaft and rotatable by said electric motor in a reciprocating manner;
   a second toothed chain wheel mounted on said invert shaft; and
   an endless chain extending between and engaging said first and second toothed chain wheels permitting rotation of said invert shaft by said electric motor.

6. An invert mechanism according to claim 1, wherein said transmission engages said invert shaft at an end thereof.

7. An invert mechanism according to claim 3, wherein said transmission engages said invert shaft at an end thereof.

8. An invert mechanism according to claim 1, further comprising a drive sleeve coaxially mounted between said invert shaft and said guide sleeves, said drive sleeve being rotationally fixed relative to said invert shaft and having a plurality of splines extending outwardly therefrom, said guide sleeves having a complementary spline profile engaging said splines, an axially extending slot being positioned in said drive sleeve for receiving said pins extending from said guide sleeves to said cam sleeve.

9. An invert mechanism according to claim 3, further comprising a drive sleeve coaxially mounted between said invert shaft and said guide sleeves, said drive sleeve being rotationally fixed relative to said invert shaft and having a plurality of splines extending outwardly therefrom, said guide sleeves having a complementary spline profile engaging said splines, an axially extending slot being positioned in said drive sleeve for receiving said pins extending from said guide sleeves to said cam sleeve.

10. An invert mechanism according to claim 6, further comprising a drive sleeve coaxially mounted between said invert shaft and said guide sleeves, said drive sleeve being rotationally fixed relative to said invert shaft and having a plurality of splines extending outwardly therefrom, said guide sleeves having a complementary spline profile engaging said splines, an axially extending slot being positioned in said drive sleeve for receiving said pins extending from said guide sleeves to said cam sleeve.

11. An invert mechanism according to claim 8, further comprising a pair of annular spring clamping units for effecting attachment between said drive sleeve and said invert shaft, said cam sleeve having opposite end faces, each one of said annular spring clamping units being positioned adjacent to one of said end faces.

12. An invert mechanism according to claim 9, further comprising a pair of annular spring clamping units for effecting attachment between said drive sleeve and said invert shaft, said cam sleeve having opposite end faces, each one of said annular spring clamping units being positioned adjacent to one of said end faces.

13. An invert mechanism according to claim 8, further comprising:
   a pair of end faces positioned at opposite ends of said drive sleeve;
   a pair of annular pistons slidably movable along said invert shaft, each said piston being positioned adjacent to one of said end faces of said drive sleeve, each said piston being attached to one of said guide sleeves; and
   a duct extending through said invert shaft adapted to conduct a pressurized fluid therethrough, said duct having a first and a second opening positioned adjacent to each end face of said drive sleeve, respectively, for providing said pressurized fluid between each of said pistons and said end faces, said pistons being movable away from said end faces upon said pressurized fluid being introduced into said duct, thereby effecting movement of said guide sleeves, and said holder halves attached thereto, away from one another.

14. An invert mechanism according to claim 9, further comprising:
   a pair of end faces positioned at opposite ends of said drive sleeve;
   a pair of annular pistons slidably movable along said invert shaft, each said piston being positioned adjacent to one of said end faces of said drive sleeve, each said piston being attached to one of said guide sleeves; and
   a duct extending through said invert shaft adapted to conduct a pressurized fluid therethrough, said duct having a first and a second opening positioned adjacent to each end face of said drive sleeve, respectively, for providing said pressurized fluid between each of said pistons and said end faces, said pistons being movable away from said end faces upon said pressurized fluid being introduced into said duct, thereby effecting movement of said guide sleeves, and said holder halves attached thereto, away from one another.

15. An invert mechanism according to claim 11, further comprising:
   a pair of end faces positioned at opposite ends of said drive sleeve;
   a pair of annular pistons slidably movable along said invert shaft, each said piston being positioned adjacent to one of said end faces of said drive sleeve, each said piston being attached to one of said guide sleeves; and
   a duct extending through said invert shaft adapted to conduct a pressurized fluid therethrough, said duct having a first and a second opening positioned adjacent to each end face of said drive sleeve, respectively, for providing said pressurized fluid between each of said pistons and said end faces, said pistons being movable away from said end faces upon said pressurized fluid being introduced into said duct, thereby effecting movement of said guide sleeves, and said holder halves attached thereto, away from one another.

16. An invert mechanism according to claim 12, further comprising:
   a pair of end faces positioned at opposite ends of said drive sleeve;
   a pair of annular pistons slidably movable along said invert shaft, each said piston being positioned adjacent to one of said end faces of said drive sleeve, each said piston being attached to one of said guide sleeves; and
   a duct extending through said invert shaft adapted to conduct a pressurized fluid therethrough, said duct having a first and a second opening positioned adjacent to each end face of said drive sleeve, respectively, for providing said pressurized fluid between each of said pistons and said end faces, said pistons being movable away from said end faces upon said pressurized fluid being introduced into said duct, thereby effecting movement of said guide sleeves, and said holder halves attached thereto, away from one another.

17. An invert mechanism according to claim 13, further comprising a pair of biasing springs, each of said springs being positioned between one of said pistons and said invert shaft for biasing said pistons toward said end faces of said drive sleeve.

18. An invert mechanism according to claim 14, further comprising a pair of biasing springs, each of said springs being positioned between one of said pistons and said invert shaft for biasing said pistons toward said end faces of said drive sleeve.

19. An invert mechanism for a glass forming machine for pre-forming and finishing forming parisons held in a neck mold, said glass forming machine including a frame box having a cover plate mounted thereon, and a parison pre-forming station and a parison finishing forming station, said invert mechanism comprising:

- an invert shaft rotatably mounted on said glass forming machine above said cover plate and positioned between said pre-forming and finishing forming stations;
- a neck mold holder mounted on said invert shaft and movable between said pre-forming and finishing forming stations upon rotation of said invert shaft, said neck mold holder comprising holder halves movable along said invert shaft toward and away from one another for engaging and releasing said neck mold;
- an electric motor mounted on said glass forming machine and having a drive shaft with a longitudinal axis positioned above said cover plate;
- a transmission positioned between said electric motor and said invert shaft for transmitting torque from said drive shaft to said invert shaft for rotating said invert shaft between said pre-forming and finishing forming stations;
- a cam sleeve mounted coaxially on said invert shaft, said cam sleeve being rotatable relative to said invert shaft and fixed axially thereon;
- a pair of cam grooves formed in the surface of and extending axially and circumferentially along said cam sleeve, said cam grooves being symmetric to one another about a mid-plane intersecting said cam sleeve; and
- a pair of guide sleeves mounted coaxially on said cam sleeve adjacent to one another, said guide sleeves being rotationally fixed relatively to said invert shaft and axially movable there along, each said guide sleeve having a pin extending inwardly therefrom toward said cam sleeve, each said pin having a cam roller mounted thereon and positioned within one of said cam grooves in said cam sleeve for engagement therewith, each of said neck mold halves being mounted on a respective one of said guide sleeves for rotational motion between said pre-forming and finishing forming stations and for axial motion toward and away from one another for engaging and releasing said neck mold.

20. An invert mechanism according to claim 19, further comprising a drive sleeve mounted coaxially between said invert shaft and said guide sleeves, said drive sleeve being rotationally fixed relative to said invert shaft and having a plurality of splines extending outwardly therefrom, said guide sleeves having a complementary spline profile engaging said splines, an axially extending slot being positioned in said drive sleeve for receiving said pins extending from said guide sleeves to said cam sleeve.

* * * * *

UNITED STATES PATENT AND TRADEMARK OFFICE
CERTIFICATE OF CORRECTION

| | | |
|---|---|---|
| PATENT NO. | : 7,047,766 B2 | |
| APPLICATION NO. | : 10/275015 | |
| DATED | : May 23, 2006 | |
| INVENTOR(S) | : Schneider et al. | |

It is certified that error appears in the above-identified patent and that said Letters Patent is hereby corrected as shown below:

Column 4, line 18, replace "retune" with --return--

Signed and Sealed this

Twenty-ninth Day of August, 2006

JON W. DUDAS
*Director of the United States Patent and Trademark Office*